United States Patent [19]

Knafelc et al.

[11] Patent Number: 5,154,159
[45] Date of Patent: Oct. 13, 1992

[54] TURBO GRILL COOKER

[75] Inventors: Frank M. Knafelc, Lafayette; Ronald E. Heiskell, Tracy; Ezra E. Theys, San Mateo, all of Calif.

[73] Assignee: The Clorox Company, Oakland, Calif.

[21] Appl. No.: 720,407

[22] Filed: Jun. 25, 1991

[51] Int. Cl.$^5$ .......................... A47J 37/00; F24B 3/00
[52] U.S. Cl. ................... 126/25 R; 126/25 A; 126/25 B; 126/154
[58] Field of Search ............... 126/25 R, 25 A, 25 B, 126/25 AA, 154, 152 A, 152 B, 173, 41 R, 276; 99/421, 443 R

[56] References Cited

U.S. PATENT DOCUMENTS

| | | | |
|---|---|---|---|
| 1,069,802 | 8/1913 | Mokry | 126/154 |
| 1,711,131 | 4/1929 | Thomas | 126/154 |
| 2,943,557 | 7/1960 | Suehlsen | 126/25 B |
| 2,950,712 | 8/1960 | Terry | 126/25 B |
| 3,385,283 | 5/1968 | Zbikowski et al. | 126/25 A |
| 3,398,733 | 8/1968 | Bradley | 126/25 B |
| 3,529,556 | 9/1970 | Barnes | 126/25 R |
| 3,664,322 | 5/1972 | Clark | 126/25 A |
| 3,696,800 | 10/1972 | Close, Jr. | 126/25 A |
| 3,714,937 | 2/1973 | Limstead | 126/25 R |
| 3,814,076 | 6/1974 | Zankowsky et al. | 126/25 A |
| 3,934,520 | 1/1976 | Brennan | 126/25 B |
| 3,943,837 | 3/1976 | Trkla | 126/25 A |
| 4,130,103 | 12/1978 | Zimmerman | 126/25 B |
| 4,281,633 | 8/1981 | Wackerman | 126/25 C |
| 4,414,906 | 11/1985 | Hartouni | 126/25 R |
| 4,416,248 | 11/1983 | Schlosser | 126/9 B |
| 4,436,081 | 3/1984 | Hefling | 126/25 A |
| 4,510,916 | 4/1985 | Ogden | 126/25 B |
| 4,531,507 | 7/1985 | Gerson | 126/25 B |
| 4,567,876 | 2/1986 | Ogden | 126/25 B |
| 4,603,679 | 8/1986 | Ogden | 126/25 B |
| 4,624,239 | 11/1986 | Yellin | 126/25 R |

Primary Examiner—James C. Yeung
Attorney, Agent, or Firm—Warren J. Krauss

[57] ABSTRACT

A portable barbecue cooker for use without solvent ignition means or impregnated charcoal briquets. A turbo air blower communicates with ignited briquets through a distributive port plenum chamber and brings ignited briquets to operating temperature rapidly. A vertically and rotationally movable elevator brings the briquets, at operating temperature, to the char grill, and by conveying rotary movement to the char grill, distributes the briquets evenly thereupon. The elevator engages the char grill for vertical movement and for variable spacing with respect to the cook grill. The char grill is equipped with a support cage and plough blades which rotate with the char grill to move ashes from the cooker bowl bottom for transport to an ash collector. Either paper kindling or piezoelectric means provide initial ignition for the briquets in an ignition chamber.

22 Claims, 5 Drawing Sheets

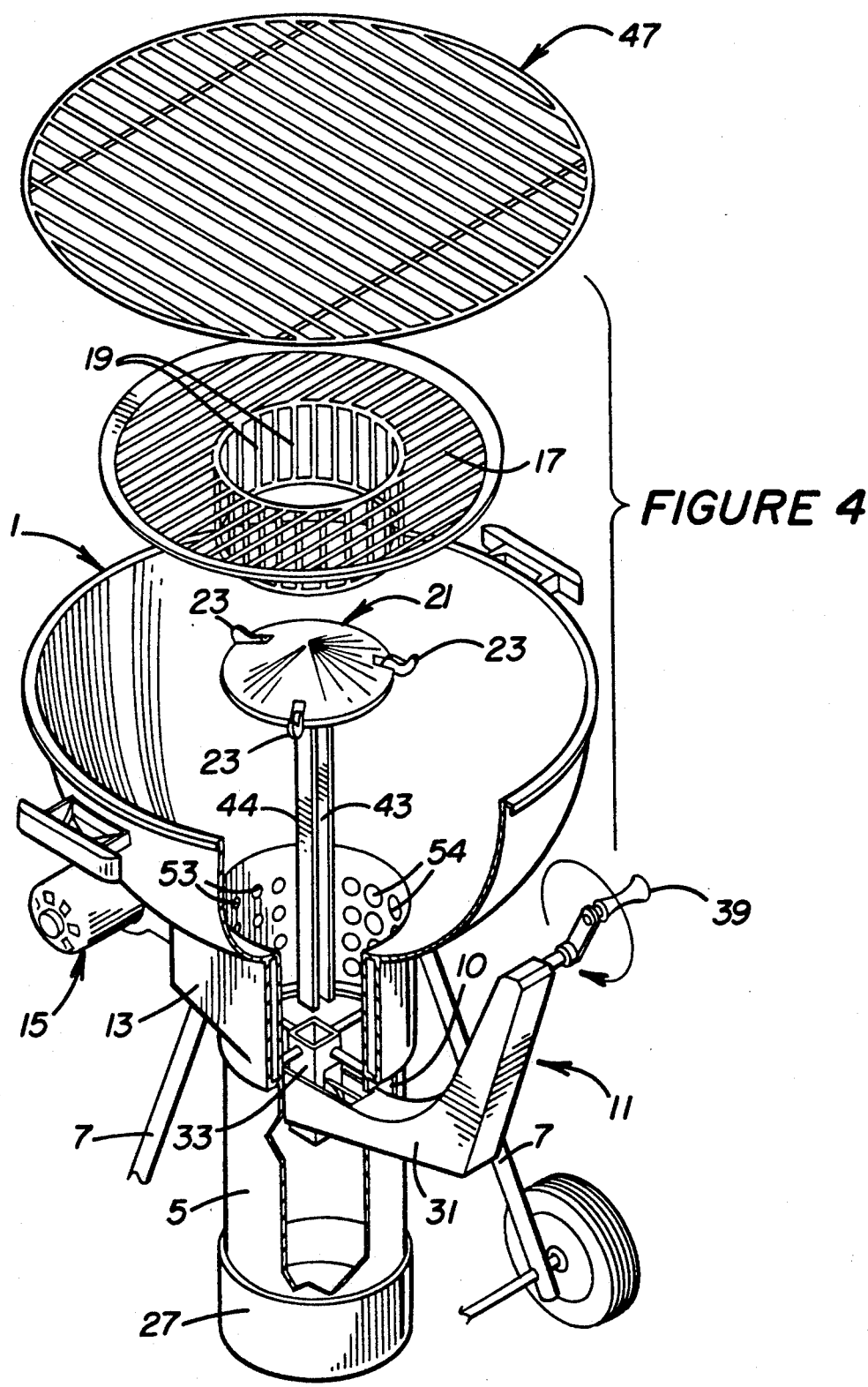

TURBO GRILL COOKER

BACKGROUND OF THE INVENTION

This invention relates to a barbecue cooker which incorporates a briquet ignition and blower system which brings cold charcoal briquets to operating temperature within a few minutes. The cooker incorporates a multi-purpose elevator mechanism which delivers briquets at operating temperature to the char grill and evenly distributes them thereover. The char grill cooperates with the elevator mechanism to transport ashes out of the bowl of the cooker to a removable collection chamber.

The field of barbecue grill cookery has lacked substantial development in certain critical areas. One of the vexing problems with prior art cookers is their inability to quickly and evenly ignite and bring the fuel, charcoal briquets, to operating temperature without the use of solvents or impregnation with artificial combustion enhancers, such as liter fluid, which might tend to impart undesired taste to the food being cooked and which might have an undesirable environmental impact. The present invention solves this problem by allowing the user to employ paper, or other natural kindling, to ignite cold, unimpregnated charcoal briquets in an ignition chamber. The chamber communicates, through a distributive aperture plenum chamber, with a turbo air blower which supplies air under pressure to increase the combustion rate of the briquets. This enables cold briquets to be brought to operating temperature in a matter of minutes and without use of the solvents or other artificial materials.

Another problem solved by the present invention is that of even distribution of hot briquets across the surface of the char grill without removal of the cook grill. Even distribution of hot briquets was formerly accomplished by manual removal of the cook grill and manual distribution of hot briquets across the surface of the char grill. The present invention has a vertically and rotationally movable elevator which engages the char grill, after delivering hot briquets thereto, and rotates the char grill to evenly distribute the hot briquets by means of centrifugal force.

Another problem not properly addressed by prior art devices is clean and efficient ash removal. In conventional bowl cookers, ash removal is accomplished by removal of both the cook grill and the char grill with subsequent overturning of the bowl and dumping of the ashes into an external receptacle. Residual, partially burned briquets, must be removed manually from the surface of the char grill and stored externally for future use, if any. The present invention provides rotatable plough blades which are attached to the char grill and which conform to the shape of the interior of the bowl. Upon rotation of the elevator and char grill, the plough blades rotate and transport ashes from the bowl bottom to a closed removable collection chamber for clean and efficient disposal.

SUMMARY AND OBJECTS OF THE INVENTION

The instant turbo grill cooker comprises a portable cooker bowl fitted with a cook grill for supporting food to be cooked and a char grill for supporting charcoal briquets. The char grill is movable both in vertical and horizontal planes for controlling proximity to the cook grill and for distribution of heated briquets, respectively. A movable elevator is provided for raising heated briquets from an ignition chamber to the char grill. The ignition chamber communicates with a turbo air blower by means of a perforated plenum chamber wall which distributes combustion enhancing air evenly to the surfaces of cold briquets for rapid heating. Attached to and movable with the char grill are plough blades which conform to the shape of the interior of the cook bowl and which, upon manipulation, transport ashes to a removable ash collection chamber.

The primary object of the present invention is to provide a portable grill cooker which has means for rapidly igniting and bringing cold briquets to operating temperature.

Another object of the present invention is to provide a cooker which has automatic means for transporting heated charcoal briquets to the char grill and for evenly distributing the briquets thereupon.

A further object of the present invention is to provide a cooker which has means for readily collecting and removing ash materials.

Another object of the present invention is to provide a cooker which enables rapid ignition of charcoal briquets, internally of the cooker, without external means, and without use of solvents or other flavor-affecting and otherwise undesirable materials.

Other objects and advantages of the present invention will become apparent from the following drawings and description.

The accompanying drawings show, by way of illustration, the preferred embodiments of the present invention, and the principles thereof. It should be recognized that other embodiments of the invention, applying the same or equivalent principles, may be used and that structural changes may be made as desired by those skilled in the art without departing from the spirit of the invention.

BRIEF DESCRIPTION OF THE DRAWINGS

FIG. 4 is an exploded isometric view showing the char grill assembly in relation to other components.

DETAILED DESCRIPTION

Figure 1:
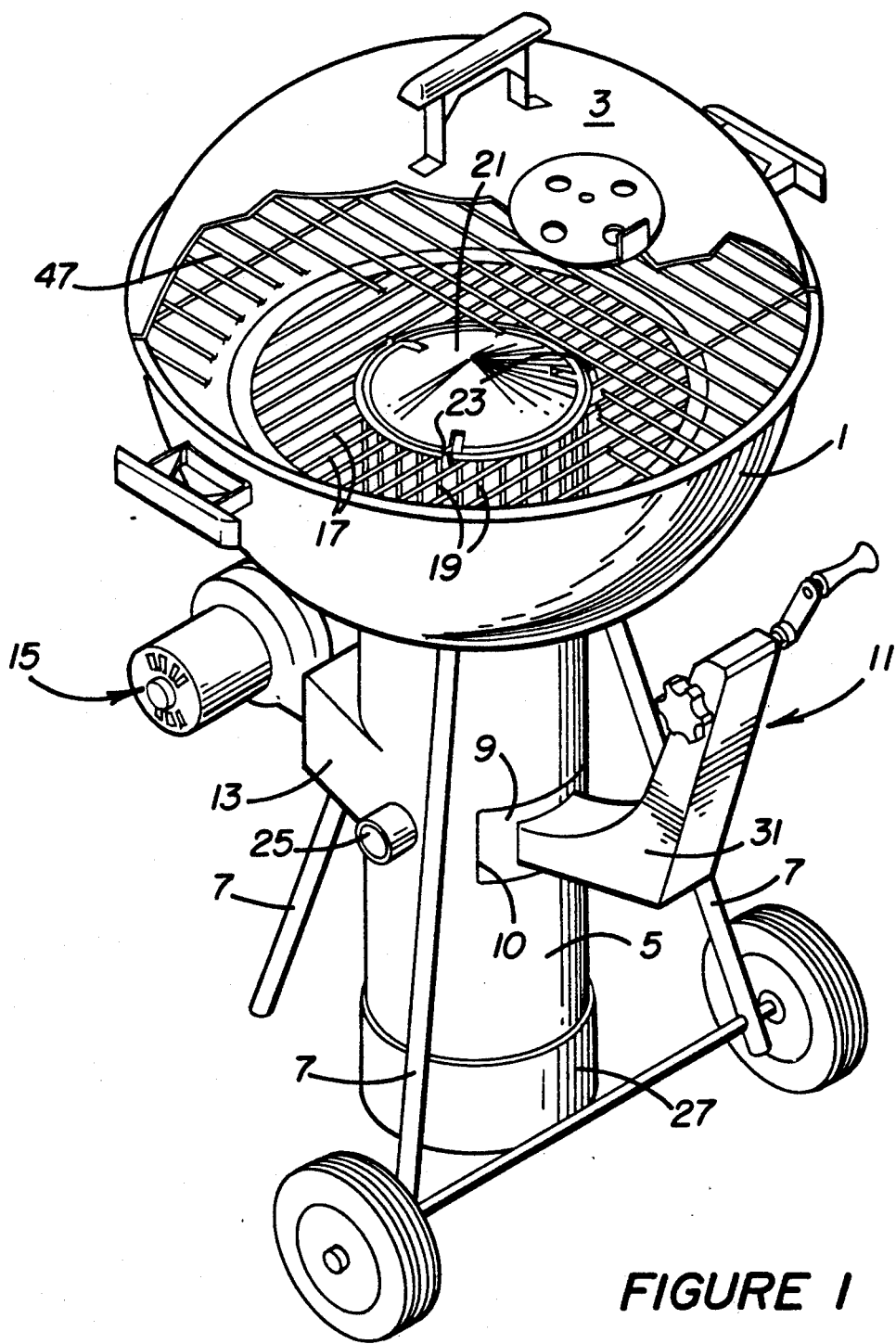
FIG. 1 is a partially cut away isometric view of the instant turbo grill cooker showing the major components thereof.

With reference to FIG. 1 in the drawings, the overall construction and component parts of the instant cooker may be appreciated. A hemispherical cook bowl 1 is fitted with a suitable vented cover member 3. The bowl is connected to and communicates with, by way of a centrally disposed opening, a base cylinder 5. The bowl, the cylinder, and accompanying components are suitably mounted upon a wheeled frame structure 7 for portability.

The cylinder 5 is slotted at 9 for movably receiving an elevator cranking and rotating mechanism shown generally at 11. The base cylinder also has a channel 13 which communicates with a turbo air blower or fan shown generally at 15. The cooker, as illustrated in FIG. 1, shows partially a cook grill 47 upon which food would be placed during cooking. The cook grill is partially cut-away to make visible the char grill 17 upon which heated briquets are disposed during the cooking process.

The char grill is composed of a set of upper concentric rings spanned by a plurality of parallel rods. It has a centrally disposed aperture defined by the inner ring, and also includes a cylindrically formed set of vertical rods 19 which are adapted to form a support cage for the char grill when it rests upon the interior bottom portion of the bowl. The rods 19 also serve to contain heated briquets prior to delivery thereof to the top surface of the char grill, as explained hereinafter.

The top surface or platform of an elevator is shown at 21. This platform is partially conically shaped for distribution of briquets, as explained more fully hereinafter.

Also visible in FIG. 1, are a plurality of char grill engaging lift hooks 23. These hooks are pivotally attached to the elevator platform 21. Upon upward movement of the elevator platform, these hooks engage the char grill and cause simultaneous movement thereof with the elevator platform.

At 25 the base cylinder 5 is equipped with a lighting hole or aperture through which a source of ignition flame such as a match or a piezoelectric igniter can be extended for igniting paper or other kindling preparatory to combustion of the briquets.

A removable ash collector is shown at 27. This device collects ashes generated in the interior of the cook bowl, as explained more fully hereinafter.

Figure 2:
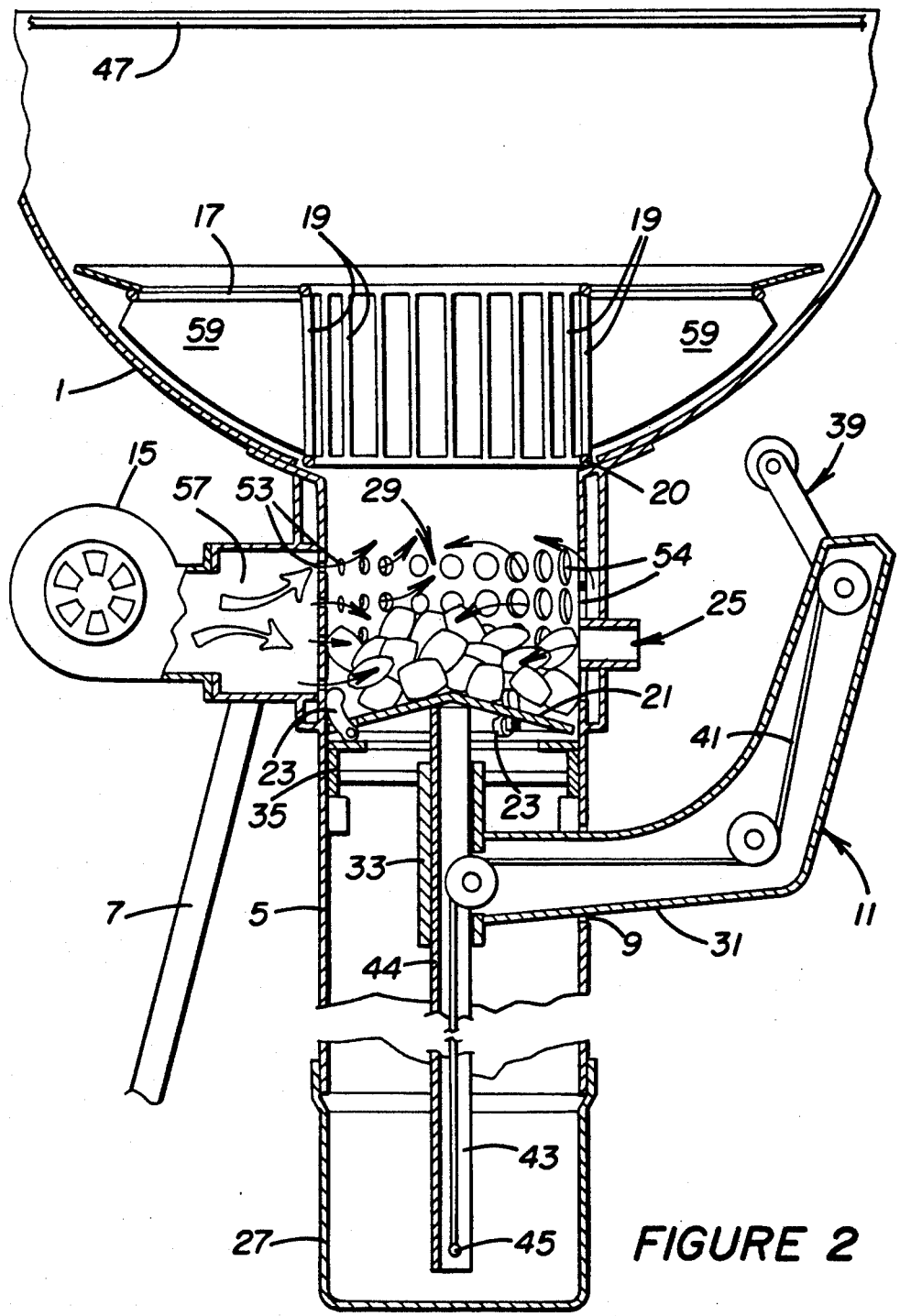
FIG. 2 is a section view of a portion of the instant cooker showing the elevator in "down" position with briquets to be ignited in the ignition chamber.
Figure 3:
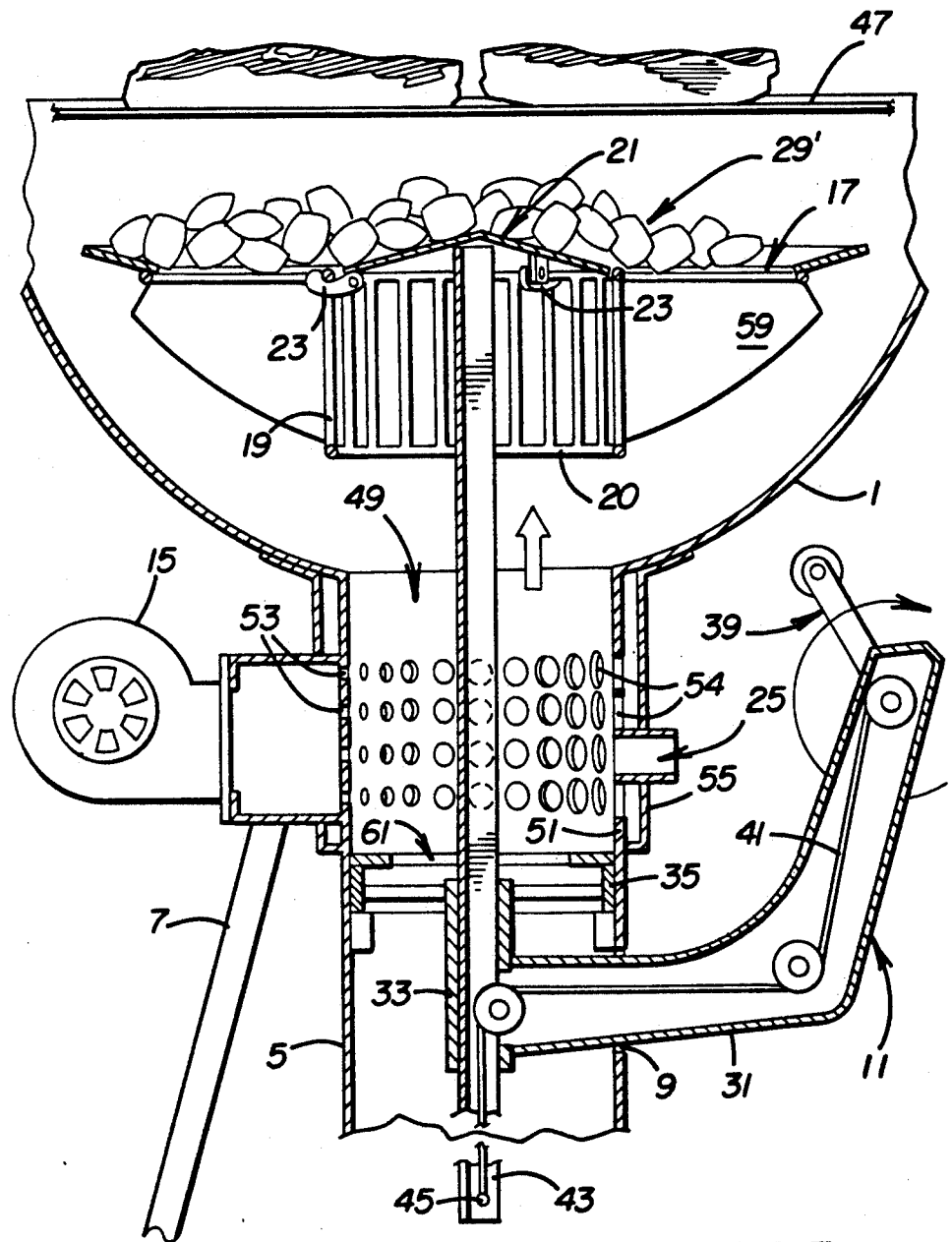
FIG. 3 is a section view of the cooker, similar to that in FIG. 11 but showing the elevator in "raised" position after having delivered heated briquets to the char grill.

With reference to drawing FIGS. 2, 3, 4, and 5, additional details of the invention and its operation may be appreciated. FIGS. 2 and 5A illustrate the disposition of elements when the elevator platform 21 is in its "down" position wherein it is supporting unignited "cold" charcoal briquets shown generally at 29. FIGS. 3 and 5B show the disposition of elements when the elevator platform 21 is in its "up" position wherein it has lifted "hot" briquets 29, to the char grill 17.

To accomplish selective raising and lowering of the elevator platform 21, the elevator cranking and rotating mechanism 11 is provided. This mechanism includes a housing 31 which is unitary with a sleeve 33 which is, in turn, rotatably mounted by means of extended flanges 35 within the base cylinder 5 and is prevented from further downward movement by stops 37.

The cranking mechanism further includes a crank and handwheel, shown generally at 39 and a suitable cable 41 fixed to the elevator shaft 43 at a point 45. Manipulation of the crank and wheel mechanism 39 winds the cable around the handwheel and causes the elevator shaft and elevator platform to rise in the expected fashion. The crank and handwheel mechanism includes a conventional brake or locking device which enables the user to lock the elevator in any selected vertical position.

Figure 5A:
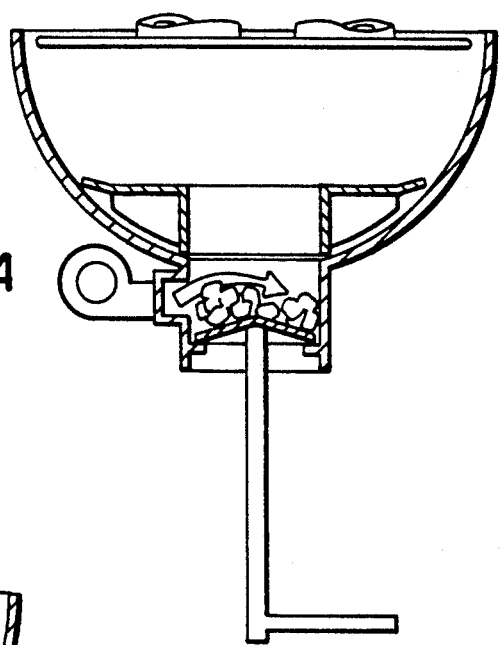
FIG. 5A–C are schematic views illustrating cooker operations.
Figure 5B:
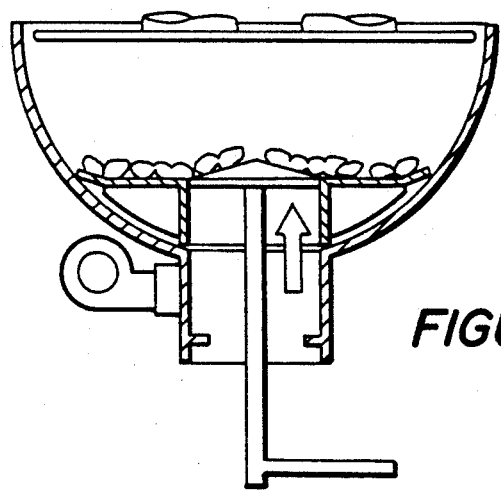
Figure 5C:
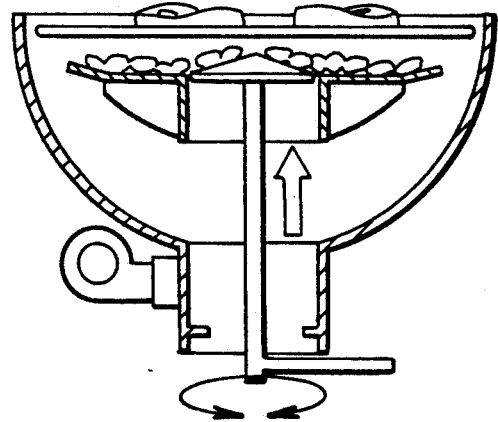

As clearly shown in FIGS. 1, 2, and 5C, the housing 31 extends through the laterally enlarged slot 9 and is movable rotationally laterally, along with the sleeve 33, until it makes contact with the lateral edges of the slot 10. Rotational manipulation of the housing 31 within the slot 9 will correspondingly rotate the sleeve 33 and the elevator shaft 43 to which it is keyed as by key means 44.

In FIG. 3 at 47, is a partial showing of the cook grill for the instant cooker. The cook grill is the element upon which the food to be cooked rests. It receives heat from the glowing briquets 29' disposed below it on the char grill 17 and the distance between it and the char grill effects the cooking rate. The mechanism for lifting and lowering the char grill 17 with respect to the cook grill 47 will now be described. The vertical rods 19 are part of the char grill 17. They extend downwardly in cylindrical configuration and are affixed at their lower ends to the support ring 20. The circle circumscribed by the support ring 20 is slightly larger than the cook bowl bottom aperture 49 such that the ring 20 may supportingly engage the periphery of the cook bowl bottom aperture, as shown in FIG. 2.

As shown in FIGS. 2, 3 and 4, the lift hooks 23 are outwardly pivotally mounted upon and movable with the elevator platform 21. When the elevator is in its down-most position, as shown in FIG. 2, the hooks are retracted and confined within the wall of the base cylinder 5. When the elevator is raised, as shown in FIG. 3, the hooks remain retracted until they reach the interstices between the vertical rods 19 whereupon they pivot outwardly and, upon further upward movement of the elevator platform, they engage the char grill, as shown in FIG. 3. Once the hooks engage the char grill, all further movement of the elevator platform is transmitted to the char grill.

The inventive provisions for rapid ignition and heating of briquets will now be explained. As shown in FIGS. 2 and 3, beneath the cook bowl bottom aperture 49 is an ignition chamber, the walls of which are attached to the cook bowl and form part of the base cylinder 5. The cylindrical wall 51 of the ignition chamber is perforated with holes of progressively larger size, starting with the smallest aperture sets 53 on the left-most side of the chamber, as shown in FIG. 3, and progressing to the largest aperture sets 54 on the opposite side of the chamber.

Surroundingly disposed about the ignition chamber is a plenum chamber defined by the walls 51 and 55. The outer plenum wall 55 communicates directly with an air inlet chamber 57 which in turn communicates with the outlet of a turbo air fan, such as a conventional central inlet centrifugal fan represented generally at 15. When the turbo fan or blower is operated, air under pressure is pushed first through the smallest apertures 53 and then, as the distance away from the blower increases, through the progressively larger apertures, including the largest set at 54, and into the interior of the ignition chamber. The enlargement of apertures as the distance from the source of pressurized air increases assures an even distribution and volume of air to all portions of the briquets. This inventive air delivery system causes the development of an air "vortex" in the ignition chamber which vortex hastens briquet ignition and promotes uniform burning.

An important feature of the invention is the ash transport and collection system. As shown in FIGS. 2 and 3, plough blades 59 are attached to the vertical rods 19 of the char grill assemblage. These outwardly extending blades have a lower edge which conforms in shape to the cook bowl interior. As shown in FIGS. 2 and 5B, when the char grill is at its lower-most position, the plough blades 59 are closely proximate the interior bottom of the cook bowl and, upon rotation thereof, will sweep or move any ash material which might be present in the bowl. The blades 59 may be rotated at will by means of rotation of the elevator platform 21 as previously described. When the ashes are swept downwardly by the blades through the aperture 49 in bowl 1, they fall through the open aperture 61 of the ignition chamber and collect in the removable ash collector 27 as shown in FIG. II.

OPERATION

When it is desired to rapidly ignite and bring to operating temperature a quantity of charcoal briquets, the cook grill 47 is removed from the bowl 1 and a small wad of paper is placed into the ignition chamber in contact with the elevator platform 21. The platform is disposed in its lower-most position, as shown in FIGS. 2 and 5A. A plurality of unimpregnated charcoal briquets are loaded into the ignition chamber on top of the wadded paper. A match or other ignition source, such as a piezoelectric igniter, is inserted through the hole 25 in contact with the wadded paper to cause it to ignite. Immediately upon the ignition of the paper, the turbo blower 15 is operated and high pressure air is forced into the plenum chamber defined by the walls 51 and 55. The air then evenly transmits through the apertures 53 through 54 to aggressively support combustion of the charcoal briquets. Within a few minutes, the confined charcoal briquets, in a high pressure air environment, reach operating temperature and are glowing hot preparatory to use as a heat source for cooking. The turbo blower is turned off as soon as the briquets reach operating temperature.

To transmit the hot coals to the surface of the char grill 17, the operator manipulates the brake-equipped handwheel and crank 39 causing the elevator platform 21 to rise, along with its cargo of hot briquets. When the elevator rises above the ring 20 of the char grill, the lift hooks 23 pivot outwardly and eventually engage, as shown in FIG. 3, the top surface of the char grill 17. As the conical-shaped elevator platform 21 rises above the upper surface of the char grill 17, the briquets spill outwardly off the platform and onto the char grill 17 but they remain substantially in a centrally "bunched" configuration, as shown in FIG. 5B. In order to distribute the briquets across the surface of the char grill 17 for uniform cooking, the operator merely rotates the housing 31 laterally back and forth within the confines of the slot 9, thus transporting, by centrifugal force, the centrally disposed briquets to the radially outward portions of the char grill 17, as shown in FIG. 5C.

As cooking progresses and the operator wishes to vary the distance between the char grill and the cook grill to control cooking rate, this may readily be accomplished by manipulation of the crank and hand wheel 39.

After cooking procedures have been concluded, the apparatus may be easily cleaned and prepared for further use without mess or exhaust of ash dust. This is accomplished by means of the operator lowering the elevator platform and the engaged char grill to a position where the ring 20 is in contact with the interior wall of the bowl 1. When this vertical position has been reached, the operator laterally displaces the housing 31, back and forth, within the slot 9 so as to move the plow blades 59 within the bowl. As previously described, this procedure moves the ashes through the cylinder 5 into the ash collector 27 for expedient disposal.

Thus, the preferred embodiments of the invention have been illustrated and described. It must be clearly understood that the preferred embodiments are capable of variation and modification and are not limited to the precise details set forth. For example, it is apparent that other means besides a match or a piezoelectric igniter could be used to start the ignition process. Also, other pressurized air sources, other than a centrifugal blower, could be used to supply the turbo plenum. This invention includes all such variations and modifications as fall within the scope of the appended claims.

We claim:

1. A cooker having cook grill means disposed generally in a first plane for supporting food to be cooked and having char grill means disposed generally in a second plane for supporting cooking fuel, said cooker having elevation means for selectively moving said char grill means toward and away from said cook grill means, said elevation means also including means for selectively rotating said char grill means in a plan parallel to said second plane for distributing fuel evenly upon said char grill means, housing means for supporting said char grill means and said cook grill means and said elevation means, said housing means including cook bowl means wherein spent fuel residue accumulates during cooking operations, and plough means movable with said char grill means for engaging spent fuel residue disposed in the cook bowl means and moving it relative to said cook bowl means to a location of collection.

2. The cooker of claim 1 wherein said housing means include base cylinder means communicating with said cook bowl means and with said location of collection and selectively removable residue collection means provided below said location of collection for disposal of said residue.

3. A cooker having cook grill means disposed generally in a first plane for supporting food to be cooked and having char grill means disposed generally in a second plane for supporting cooking fuel, said cooker having elevation means for selectively moving said char grill means toward and away from said cook grill means, said elevation means also including means for selectively rotating said char grill means in a plane parallel to said second plane for distributing fuel evenly upon said char grill means, said elevation means including platform means, said platform means having lift means for selectively engaging and disengaging said char grill means, said platform means moving with said char grill means when said lift means are so engaged and moving independently of said char grill means when said lift means are so disengaged.

4. A cooker having cook grill means for supporting food and generally disposed in a first plane, char grill means for supporting cooking fuel generally disposed in a second plane, fuel ignition chamber means for igniting fuel to be burned and for bringing fuel disposed in said ignition chamber means to cooking temperature, said ignition chamber means being generally disposed below said first and second planes, air supply means communicating with said ignition chamber means for supplying combustion supporting air under pressure to said ignition chamber means for rapidly raising fuel in the ignition chamber to cooking temperature, and elevation means for selectively transporting said fuel at cooking temperature from said ignition means to said char grill means.

5. The invention of claim 4 wherein said ignition chamber means includes an air inlet chamber communicating with said air supply means and communicating through perforate wall means with said ignition chamber.

6. The invention of claim 5 wherein said ignition chamber means includes said perforate wall means and said air supply means includes a plenum chamber disposed adjacent said perforate wall means and in communication through perforate wall with said ignition chamber means, said perforate wall having a distribution of perforations for admitting air to the ignition chamber from the plenum chamber of progressively increasing size proportional to their distance from the air inlet choker.

7. The invention of claim 6 wherein said perforations increase in size from a location most proximate to said air inlet chamber means to a location most remote from said air supply means for creating an air vortex about said ignition chamber.

8. The invention of claim 6 wherein said perforations increase in size from a point proximate to said air inlet chamber means to a point remote therefrom, said distribution of perforations creating a generally equal pressure air supply to said ignition chamber through each of said perforations.

9. The invention of claim 8 wherein the ignition chamber means is cylindrical, and the plenum chamber is an anular chamber encircling the ignition chamber.

10. The invention of claim 5 wherein said elevation means include support means for said fuel within said fuel ignition chamber means.

11. The invention of claim 10 wherein the cooker further comprises cage means disposed generally perpendicularly with respect to said char grill means, said cage means being for containing fuel when said elevation means moves fuel from said ignition chamber means to said char grill means.

12. The invention of claim 11 wherein said elevation means includes platform means, said platform means having lift hook means for selectively engaging and disengaging said char grill means, said platform means moving with said char grill means when said lift hook means is so engaged and moving independently of said char grill means when said lift hook means is so disengaged.

13. A cooker having a cook grill disposed generally in a first plane for supporting food to be cooked, a char grill disposed generally in a second plane parallel to and below said first plane for supporting cooking fuel during cooking, means forming an ignition chamber for igniting fuel to be burned and for bringing fuel disposed in said chamber to cooking temperature, said ignition chamber being generally disposed below said first and second planes, and separate elevation means for selectively moving fuel from the ignition chamber to the char grill.

14. The invention of claim 13 wherein the elevator means comprises a fuel platform and actuating means for moving said fuel platform between a lower portion of the ignition chamber and the char grill.

15. The invention of claim 14 wherein the cooker further comprises a housing including a cook bowl having an opening in the bottom thereof, wherein the ignition chamber is disposed below said opening in communication therewith.

16. The cooker of claim 15 wherein the char grill includes an opening and the cooker further comprises a cage disposed below the char grill opening and above the cook bowl opening whereby, as the platform is raised from the ignition chamber to the char grill, fuel will be retained thereon until the platform reaches the char grill plane.

17. The cooker of claim 14 further comprising hook means for vertically engaging the char grill with the platform when the platform is proximate the char grill plan whereby the char grill will be raised above the second plane when the platform is raised above the second plane.

18. The invention of claim 17 wherein said hook means includes means for rotationally engaging the char grill with the platform when the platform is proximate the char grill plane, and said actuator means includes means for selectively rotating the platform, whereby the platform and char grill may be rotated to spread fuel on the platform and char grill may be rotated to spread fuel on the platform outward onto the char grill.

19. The invention of claim 18 wherein the cook bowl means includes a lower portion where spent fuel residue will accumulate during cooking operations, and further comprising plough means reciprocitably movable with said char grill for engaging spent fuel residue disposed in the cook bowl and moving it to said opening in the cook bowl.

20. The cooker of claim 19 wherein said housing means includes base cylinder means communicating with said cook bowl opening and a removable residue collection means provided below said base cylinder means for collection and disposal of said residue.

21. The invention of claim 13 further comprising air supply means for supplying pressurized air to the ignition chamber.

22. The invention of claim 21 wherein said air supply means comprises a plenum chamber adjacent the ignition chamber and means for communicating air from the plenum chamber to the ignition chamber.

* * * * *